United States Patent
Riquet et al.

(10) Patent No.: US 10,214,293 B2
(45) Date of Patent: Feb. 26, 2019

(54) AIRCRAFT ELEMENT REQUIRING AN ANTI-FROST TREATMENT

(71) Applicant: AIRCELLE, Gonfreville l'Orcher (FR)

(72) Inventors: Audrey Riquet, Versailles (FR); Caroline Coat-Lenzotti, Toussus le Noble (FR)

(73) Assignee: AIRCELLE, Gonfreville l'orcher (FR)

( * ) Notice: Subject to any disclaimer, the term of this patent is extended or adjusted under 35 U.S.C. 154(b) by 511 days.

(21) Appl. No.: 14/877,098

(22) Filed: Oct. 7, 2015

(65) Prior Publication Data
US 2016/0023771 A1    Jan. 28, 2016

Related U.S. Application Data

(63) Continuation of application No. PCT/FR2014/050838, filed on Apr. 8, 2014.

(30) Foreign Application Priority Data

Apr. 9, 2013   (FR) ...................................... 13 53165

(51) Int. Cl.
*B64D 15/00* (2006.01)
*F02C 7/04* (2006.01)
*B64D 33/02* (2006.01)

(52) U.S. Cl.
CPC ............. *B64D 15/00* (2013.01); *B64D 33/02* (2013.01); *F02C 7/04* (2013.01); *B64D 2033/0233* (2013.01); *B64D 2033/0286* (2013.01); *F05D 2300/512* (2013.01)

(58) Field of Classification Search
CPC ............ B64D 2033/0233; B64D 15/00; B64D 3/385; B64D 11/001
See application file for complete search history.

(56) References Cited

U.S. PATENT DOCUMENTS

| | | | |
|---|---|---|---|
| 2007/0031639 A1 | 2/2007 | Hsu et al. | |
| 2008/0142238 A1 | 6/2008 | Rawlings | |
| 2011/0147219 A1* | 6/2011 | Lambourne | C25D 11/18 205/50 |
| 2011/0151186 A1* | 6/2011 | Lambourne | C08G 77/385 428/141 |
| 2014/0127516 A1* | 5/2014 | Wang | C08G 18/06 428/422 |
| 2015/0129720 A1* | 5/2015 | Strobl | B64D 15/163 244/134 D |

(Continued)

FOREIGN PATENT DOCUMENTS

| CA | 2718026 A1 | 4/2012 |
|---|---|---|
| EP | 1 845 018 | 10/2007 |

(Continued)

OTHER PUBLICATIONS

International Search Report dated Jul. 30, 2014 in International Application No. PCT/FR2014/050838.

*Primary Examiner* — Christopher P Ellis
(74) *Attorney, Agent, or Firm* — Burrie Law, PLLC

(57) ABSTRACT

The present disclosure provides an aircraft element including a leading edge section and a trailing edge section, and the leading edge section includes an anti-frost treatment device. This aircraft element is remarkable in that the trailing edge section includes a superhydrophobic surface.

7 Claims, 1 Drawing Sheet

(56) References Cited

U.S. PATENT DOCUMENTS

| | | | | |
|---|---|---|---|---|
| 2015/0183530 A1* | 7/2015 | Strobl | ................... | H01L 41/313 |
| | | | | 29/428 |
| 2015/0251767 A1* | 9/2015 | Sapper | ..................... | C09K 3/18 |
| | | | | 244/134 E |
| 2015/0284614 A1* | 10/2015 | Gross | ....................... | C09D 5/00 |
| | | | | 428/220 |
| 2016/0114883 A1* | 4/2016 | Guerry | .................. | B08B 17/065 |
| | | | | 244/200 |
| 2017/0298286 A1* | 10/2017 | Nowak | ................ | C10M 111/04 |

FOREIGN PATENT DOCUMENTS

| EP | 2 209 715 B1 | 7/2010 |
|---|---|---|
| WO | 2006/136748 A2 | 12/2006 |

\* cited by examiner

AIRCRAFT ELEMENT REQUIRING AN ANTI-FROST TREATMENT

CROSS-REFERENCE TO RELATED APPLICATIONS

This application is a continuation of International Application No. PCT/FR2014/050838, filed on Apr. 8, 2014, which claims the benefit of FR13/53165, filed on Apr. 9, 2013. The disclosures of the above applications are incorporated herein by reference.

FIELD

The present disclosure concerns the field of aircraft elements requiring an anti-frost treatment.

BACKGROUND

The statements in this section merely provide background information related to the present disclosure and may not constitute prior art.

An aircraft is propelled by one or several propulsion unit(s), each comprising a turbojet engine housed within a nacelle.

In general, a nacelle presents a substantially tubular structure surrounding the turbojet engine and comprises a leading edge section constituting an air inlet upstream of the engine and a trailing edge section comprising, from upstream to downstream of the nacelle, a mid-section intended to surround the fan of said turbojet engine and a downstream section surrounding the combustion chamber of the turbojet engine and which may be equipped with thrust reversal means, the upstream and the downstream of the nacelle being defined with reference to the flowing direction of the air flow within the nacelle when operating in the direct jet mode, the upstream of the nacelle corresponding to a portion of the nacelle through which the flow penetrates, and the downstream corresponding to an area for ejecting said air flow.

The air inlet comprises, on the one hand, an inlet lip adapted to allow optimum collection, towards the turbojet engine, of air necessary to supply the fan and the internal compressors of the turbojet engine, and on the other hand, a downstream structure on which the lip is added and which is intended to properly channel air towards the fan blades. The assembly is fastened upstream of a fan casing belonging to the mid-section of the assembly.

During a flight phase of an aircraft, it is frequent that the climatic conditions at high altitude cause the formation of frost at different locations of the aircraft.

In general, the aircraft elements presenting a leading edge are subjected to the frost accretion. For example, these may comprise an air inlet lip of a nacelle, a radome, a leading edge of a wing or a horizontal or vertical tail unit.

For example, such a formation of frost on the leading edge of the nacelle of the turbojet engine is unacceptable, because it may result in modifications of the aerodynamic profile of the nacelle, or may also damage the turbojet engine in the case of tearing-off of ice blocks formed upstream of the air inlet lip of the nacelle.

In order to avoid the accumulation of ice or frost resulting in the aforementioned drawbacks, these aircraft elements subjected to the accretion of frost or ice are generally equipped with de-frost or anti-frost devices.

A de-frost device allows cleaning, in a periodic manner, the area that is subjected to the formation of ice or frost, typically through heating or through a mechanical means, in order to remove said ice or said frost, whereas an anti-frost device aims to prevent the formation of ice or frost by heating said area in a continuous manner.

When the aircraft element to be treated against frost is an air inlet lip of a nacelle for a turbojet engine or a turboprop engine, such devices are realized, in a known manner, by collecting hot gases in the compressor of the turbojet engine or by producing hot gases by compression or heating, and by redirecting hot gases onto the surface of the air inlet lip of the nacelle.

Nonetheless, such a device requires a hot air delivery pipe system between the turbojet engine or the turboprop engine and the air inlet, as well as a system for discharging the hot air inside the air inlet lip. This increases the weight of the propulsion unit, which is not desirable.

It has been possible to overcome these drawbacks by resorting to electrical de-frost or anti-frost systems. In particular, mention may be made to document EP 1 845 018, although numerous other documents relate to the electric de-frosting and to its developments.

Implementing an electrical de-frost or anti-frost device uses sets of heating resistances, implanted at the air inlet lip proximate to the outer surface and electrically supplied.

However, whether in the case of pneumatic or electrical de-frost or anti-frost devices, a common drawback of these anti-frost treatment devices is the excessive energy consumption.

In addition, <<Open Rotor>> type turbojet engines presenting an unducted fan downstream of the nacelle and allowing to reduce the fuel consumption, require an anti-frost treatment, on the one hand, on the inner surface of the nacelle, and on the other hand, on the outer surface of said nacelle, in order to prevent ice blocks from passing through the blades of the unducted fan. Hence, for this type of turbojet engine, the energy consumption of the anti-frost treatment devices is further increased.

SUMMARY

The present disclosure provides an aircraft element comprising a leading edge section and a trailing edge section, said leading edge section comprising at least one anti-frost treatment device, said aircraft element being remarkable in that the trailing edge section comprises at least one superhydrophobic surface.

Thus, by providing for at least one superhydrophobic surface downstream of the section equipped with the anti-frost treatment device, the water droplets that result from the de-frost or anti-frost process coming from the leading edge section do no longer adhere on the surface downstream of said leading edge section, and therefore, refreezing the trickle is avoided, at least at the superhydrophobic surface.

Consequently, when the anti-frost treatment device comprises an anti-frost device, the surface to be heated is reduced compared to that of the prior art, thereby reducing the energy consumption of said device and, when the anti-frost treatment device comprises a de-frost device, the frequency of heating cycles is decreased compared to the prior art, which allows reducing the energy consumption of said device.

Thus, regardless of the type of anti-frost treatment device, the superhydrophobic characteristic of the trailing edge section allows reducing considerably the energy consumption of said anti-frost treatment device.

According to one form of the present disclosure, the aircraft element comprises a nacelle for turbojet engine or turboprop engine of an aircraft, the leading edge section comprising an air inlet lip and the trailing edge section comprising a mid-section comprising an inner surface and an outer surface radially away from said inner surface, said inner surface comprising at least one superhydrophobic surface.

According to other features of the present disclosure:

the outer surface of the nacelle further comprises at least one superhydrophobic surface. By providing for a nacelle comprising at the same time a superhydrophobic inner surface and a superhydrophobic outer surface, this nacelle is particularly intended to support an «Open Rotor» type turbojet engine, the fan of which is not ducted and is positioned downstream of said turbojet engine;

the air inlet lip comprises at least one superhydrophobic surface, which allows adapting the nacelle with a de-frost device through piezoelectric component;

the superhydrophobic surface is obtained through a surface treatment method. Unlike the hydrophobic coatings, the surface treatment allows for a good resistance to erosion. In addition, the cost for obtaining these superhydrophobic surfaces is reduced very substantially compared to obtaining hydrophobic surfaces through coatings;

the surface treatment method comprises a method for pulverizing an organometallic complex. This method is advantageously applied regardless of the nature of the surface to be treated;

the superhydrophobic surface of the air inlet lip is obtained through a chemical reaction between a fatty acid and said surface of the air inlet lip. This method is very advantageous compared to a method for pulverizing an organometallic complex when the surface to be treated is a metallic surface, such as the air inlet lip of the nacelle;

the nacelle according to the present disclosure may support an «Open Rotor» type turbojet engine.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 1:
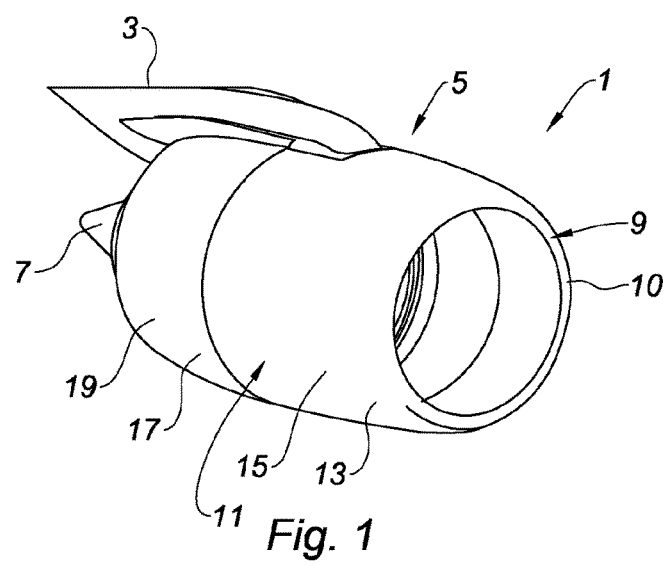
FIG. 1 represents a propulsion unit known from the prior art.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

In the present description, it is meant by aircraft element comprising a leading edge section and a trailing edge section, any element of an aircraft presenting an aerodynamic profile.

As example, such an aircraft element may be constituted by the wings of an aircraft, the (horizontal and vertical) rear tail units, the nacelles of turbojet or turboprop engines.

In the following description, reference will be made, as an illustrative and non-limiting example, to a nacelle for an aircraft turbojet engine.

Referring to FIG. 1, which represents a propulsion unit 1. Such a propulsion unit comprises a pylon 3 on which a nacelle 5 supporting a turbojet engine 7, is suspended.

The nacelle 5 comprises a leading edge section 9 constituted by an air inlet lip 10, and a trailing edge section 11 comprising a mid-section 13 of the nacelle constituted by a fixed cowl 15, and a downstream section 17 of the nacelle constituted by a cowl 19 which can accommodate thrust reversal means.

Figure 2:
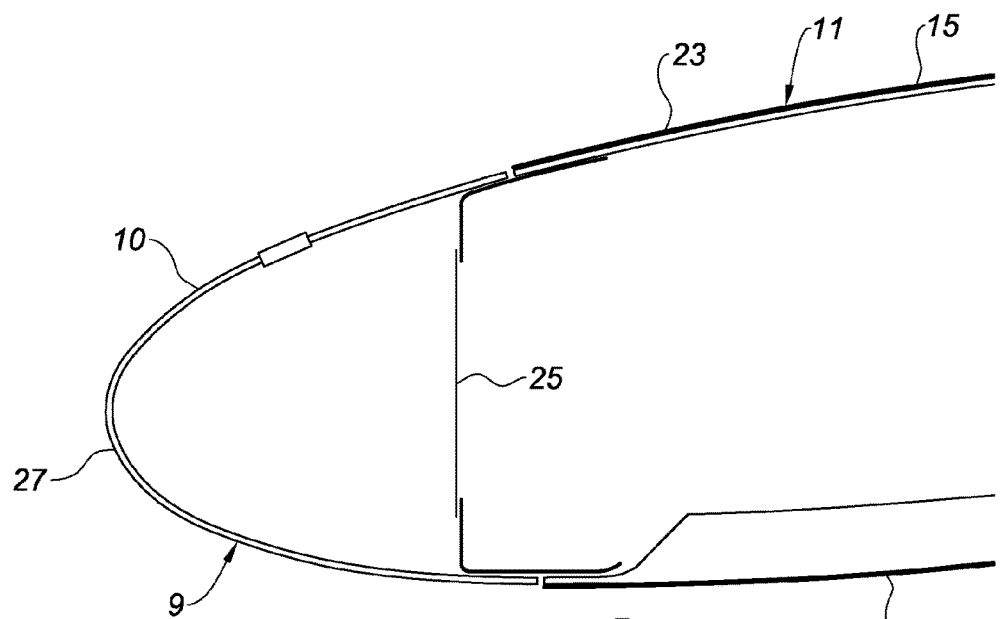
FIG. 2 is a longitudinal sectional view of the air inlet lip of the nacelle and of a portion of the trailing edge section.

Referring to FIG. 2, which schematically illustrates a longitudinal section of the air inlet lip 10 extended by the cowl 15 which comprises an inner surface 21 in contact with a cold air flow F passing through the nacelle, and an outer surface 23 radially distant with respect to said inner surface.

As is represented, the air inlet lip 10 is typically separated from the fixed cowl 15 by an annular wall 25.

The air inlet lip 10 receives an anti-frost treatment device (not represented), constituted, for example, by a pneumatic or electrical de-frost or anti-frost device.

According to the present disclosure, the trailing edge section, comprising the cowl 15 and positioned downstream of the heat-treated nacelle area, is superhydrophobic.

The superhydrophobic characterization of a material is made by measuring the contact angle between its planar surface and a water drop placed on its surface: standard materials have an angle smaller than 90°, the hydrophobic materials have an angle comprised between 90° and 150° and the superhydrophobic materials have an angle greater than 150°.

More specifically, at least one portion of the inner surface 21 of the cowl 15 is superhydrophobic.

The inner surface 21 of the cowl 15 of the nacelle is made superhydrophobic by any surface treatment method.

As a non-limiting example, the method used for making the nacelle superhydrophobic comprises a method for pulverizing an organometallic complex over the surface to be treated.

According to one variant, the outer surface 23 of the cowl 15 is also made superhydrophobic, for example, through said organometallic pulverization method. This allows making the nacelle compatible with an «open rotor» type turbojet engine, that is to say having an unducted fan at its downstream section.

One form, the metallic air inlet lip 10 of the nacelle is also superhydrophobic. As previously, the air inlet lip may be made superhydrophobic by any surface treatment method.

The outer surface 27 of the air inlet lip 10 may be treated by pulverizing an organometallic complex or may be made superhydrophobic through a reaction of a fatty acid and said outer surface 27. The superhydrophobic character of the air inlet lip allows using very advantageously a de-frost device through piezoelectric component.

The de-frosting through piezoelectric component consists in making the surface to be de-frosted vibrate in order to break and remove the thin layers of ice accumulated on the lip.

In particular, the de-frosting through piezoelectric component is described in further details in the European patent number EP 2 209 715 and belonging to the Applicant, the entire contents of which are incorporated herein in their entirety.

Thus, the use of a superhydrophobic surface as a complement to a piezoelectric-type mechanical de-frost device allows facilitating the pulling-off of ice, in that the adhesive strength of ice on the wall of the element to be de-frosted is reduced.

Whatever the methods for obtaining superhydrophobic surfaces, these surfaces are obtained through a surface treatment method. Unlike the hydrophobic coatings known from the prior art, this allows advantageously enhancing considerably the resistance to erosion of the treated surface and reducing substantially the cost of treating these surfaces.

Thanks to the present disclosure, by providing for superhydrophobic surfaces as a complement to anti-frost treatment devices, the energy consumption of these anti-frost treatment devices is reduced considerably.

Finally, it goes without saying that the present disclosure is not limited to the sole forms described above only as illustrative examples, but it encompasses, on the contrary, all variants involving the technical equivalents of the described means as well as their combinations if these are within the scope of the present disclosure.

What is claimed is:

1. An aircraft nacelle comprising:
    a leading edge section including an air inlet lip that receives an anti-frost treatment device; and
    a trailing edge section downstream of the leading edge section,
    wherein the trailing edge section comprises at least one superhydrophobic surface that complements the anti-frost treatment device to reduce energy consumption of the anti-frost treatment device.

2. The aircraft nacelle according to claim 1, wherein the trailing edge section comprises a mid-section comprising an inner surface and an outer surface radially distant from said inner surface, said inner surface comprising at least one superhydrophobic surface.

3. The aircraft nacelle according to claim 2, wherein the outer surface further comprises said at least one superhydrophobic surface.

4. The aircraft nacelle according to claim 2, wherein the air inlet lip comprises at least one superhydrophobic surface.

5. The aircraft nacelle according to claim 4, wherein said at least one superhydrophobic surface of the air inlet lip is obtained through a chemical reaction between a fatty acid and said at least one superhydrophobic surface of the air inlet lip.

6. The aircraft nacelle according to claim 1, wherein said at least one superhydrophobic surface is obtained through a surface treatment method.

7. The aircraft nacelle according to claim 6, wherein said surface treatment method comprises pulverizing an organo-metallic complex.

* * * * *